United States Patent [19]

Tetro

[11] Patent Number: 4,536,660
[45] Date of Patent: Aug. 20, 1985

[54] FLEXIBLE MEANS FOR MEASURING LIQUID LEVEL

[75] Inventor: Roland G. Tetro, Bristol, Conn.

[73] Assignee: Delaval Turbine Inc., Princeton, N.J.

[21] Appl. No.: 523,031

[22] Filed: Aug. 15, 1983

Related U.S. Application Data

[60] Continuation of Ser. No. 417,455, Sep. 13, 1982, abandoned, which is a continuation of Ser. No. 93,181, Nov. 13, 1979, , which is a division of Ser. No. 912,218, Jun. 5, 1978.

[51] Int. Cl.³ .............................................. H01H 35/18
[52] U.S. Cl. .................................. 307/118; 200/84 C; 361/398; 338/214
[58] Field of Search .................. 73/313, 314, 305–308, 73/319; 200/84 R, 84 C, 61.2; 307/118; 335/206, 207; 338/33, 215, 207, 209, 210, 212, 214; 340/623, 624; 361/331, 380, 398

[56] References Cited

U.S. PATENT DOCUMENTS

| | | | |
|---|---|---|---|
| 2,592,929 | 4/1952 | Matchett | 73/313 |
| 2,892,131 | 6/1959 | MacDonnell | 361/398 |
| 3,045,199 | 7/1962 | Shobert, II | 338/214 |
| 3,408,053 | 10/1968 | Vantroba | 200/84 C |
| 3,419,695 | 12/1968 | Dinklekamp | 200/84 C |
| 3,646,293 | 2/1972 | Howard | 73/313 |
| 3,754,118 | 8/1973 | Booker | 338/214 |
| 3,826,139 | 7/1974 | Bachman | 73/313 |
| 3,873,889 | 3/1975 | Leyba | 361/398 |
| 3,976,963 | 8/1976 | Kubler | 73/313 |
| 4,064,755 | 12/1977 | Bongoit | 200/84 C |
| 4,165,935 | 8/1979 | Bongort | 200/84 C |
| 4,186,419 | 1/1980 | Sims | 73/313 |
| 4,227,057 | 10/1980 | Kubler | 73/313 |
| 4,227,236 | 10/1980 | Kubler | 73/313 |
| 4,284,904 | 8/1981 | Tetro | 307/118 |

FOREIGN PATENT DOCUMENTS

| | | | |
|---|---|---|---|
| 2418860 | 10/1975 | Fed. Rep. of Germany | 73/308 |
| 2827223 | 11/1979 | Fed. Rep. of Germany | 73/314 |
| 1520771 | 3/1968 | France | 73/308 |
| 2343232 | 9/1977 | France | 73/305 |

Primary Examiner—G. P. Tolin
Attorney, Agent, or Firm—Hopgood, Calimafde, Kalil, Blaustein & Judlowe

[57] ABSTRACT

The invention contemplates a unitary magnetically sensitive circuit element or network and a flexibly articulatable elongate assembly of a plurality of such elements or networks, with electrical interconnection of the same, such assembly being inherently suited to precision operation as a function of length, whatever the length selected for a particular application or use. In one application to liquid-depth indication within a tank, the longate assembly is merely inserted into the tube along which a float-borne permanent magnet is guided, and the magnetically sensitive element of each successive unit is actuated as the float tracks liquid level and is displaced from actuating relation with one and then to the nextadjacent one of the circuit-element units. The connection of circuit-element units is such that electrical-resistance observation from one end of the assembly provides a direct indication of the liquid level at which the float magnet is currently operative. Various forms and a method of manufacture are described.

10 Claims, 21 Drawing Figures

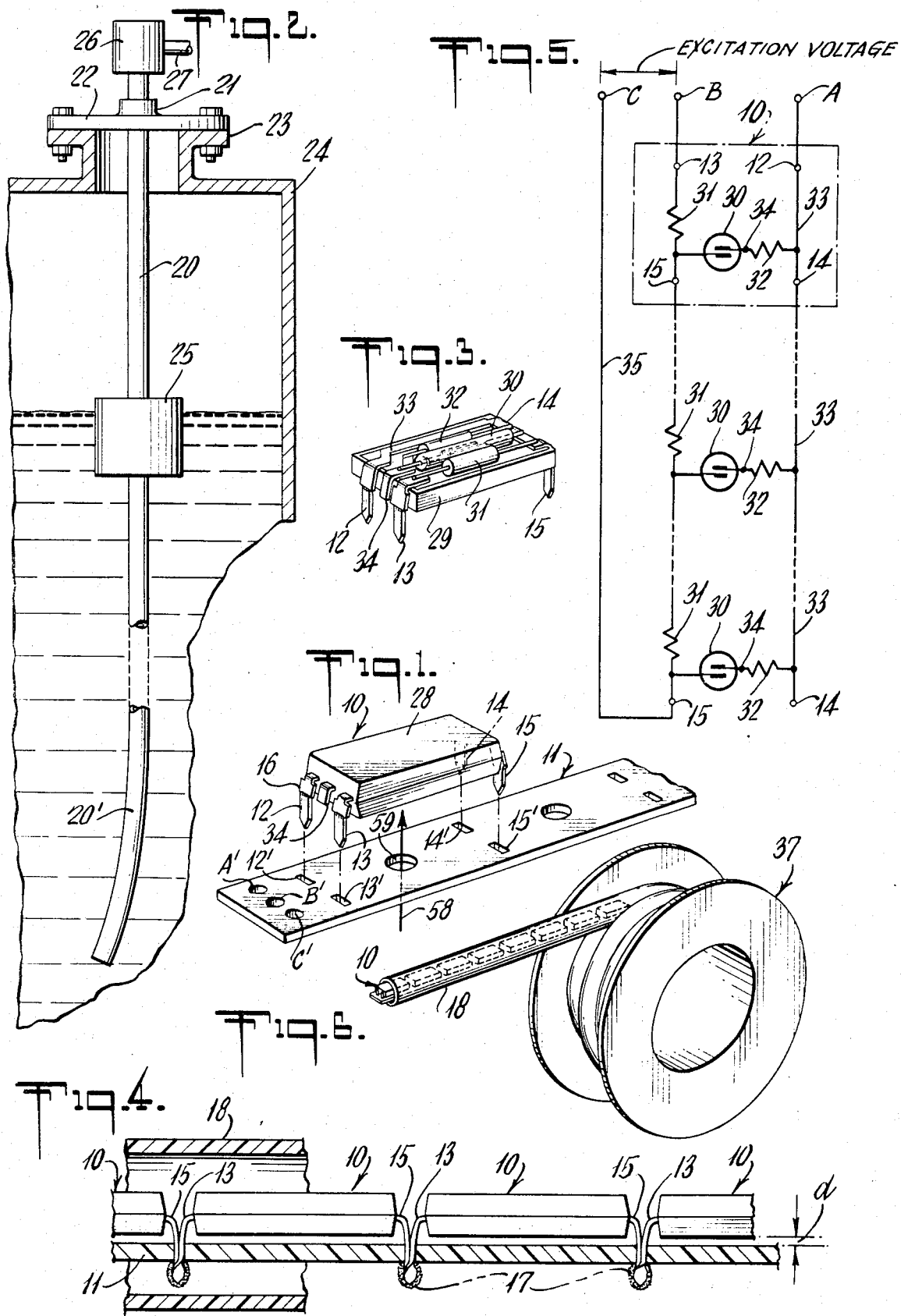

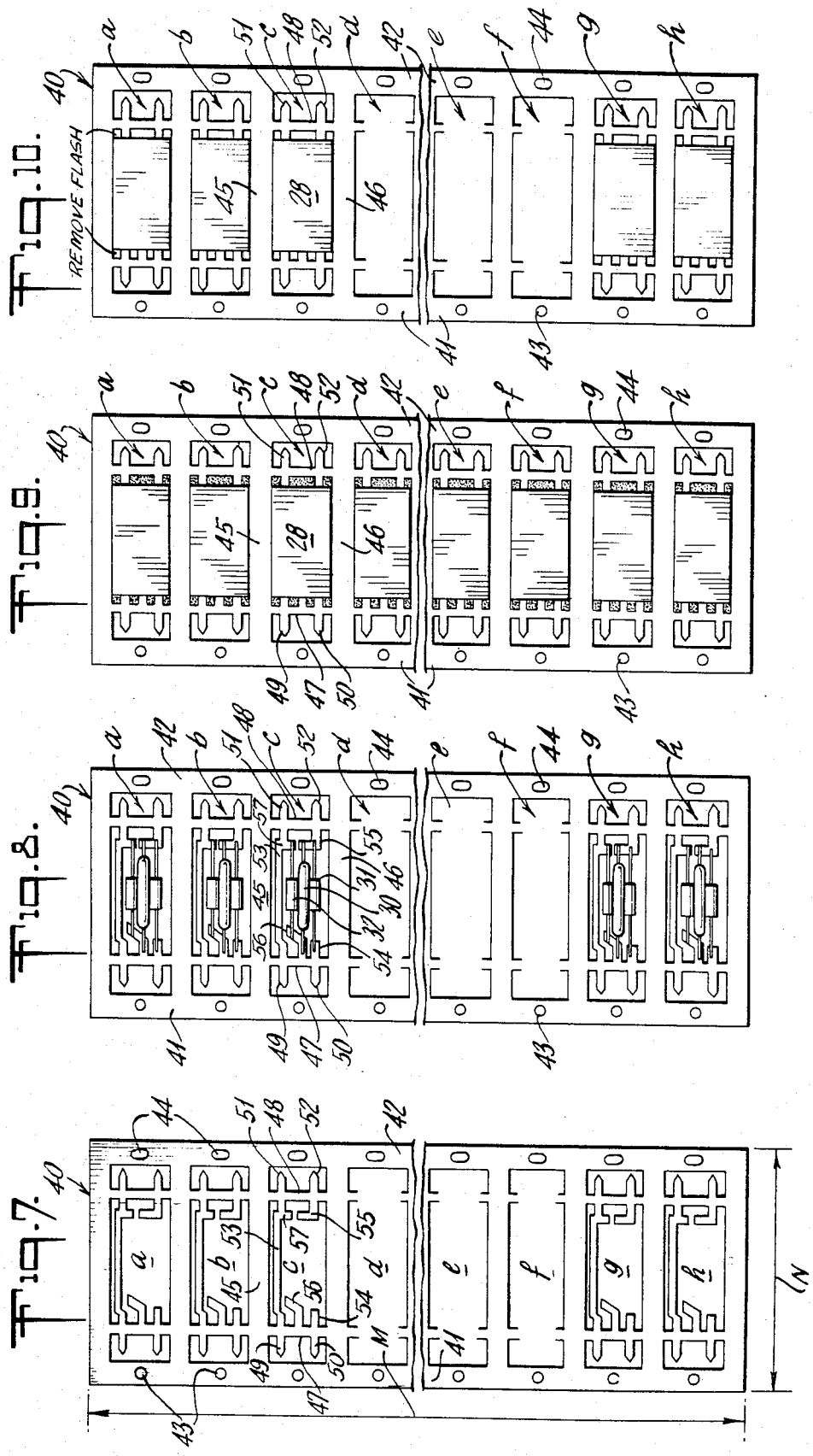

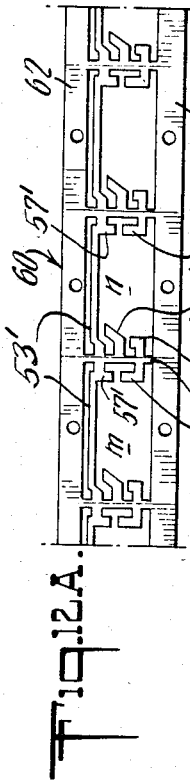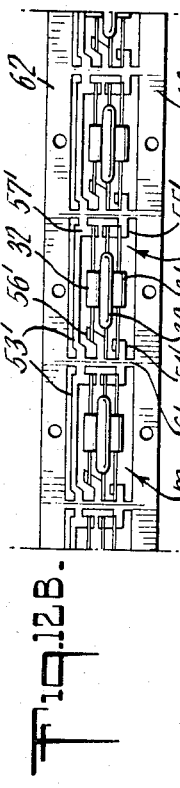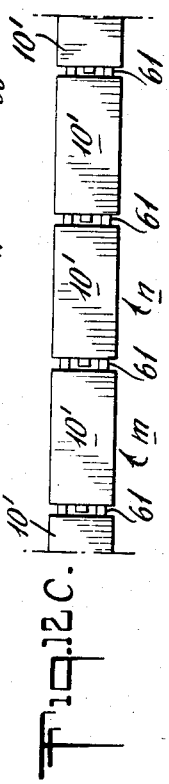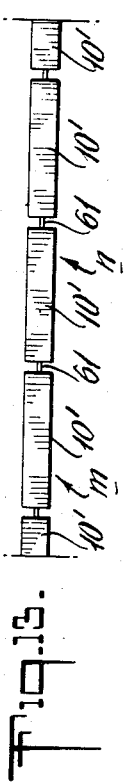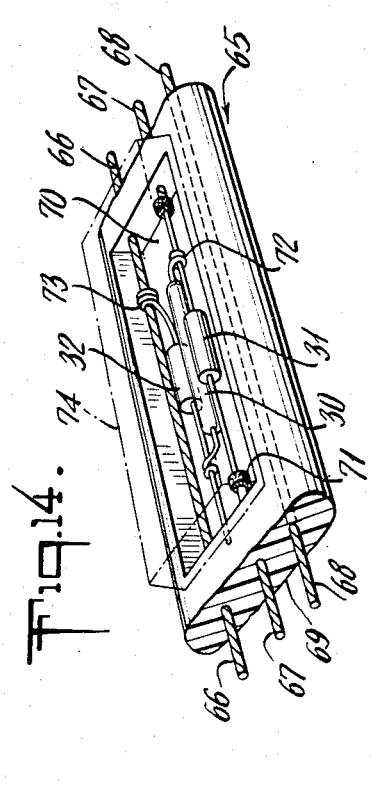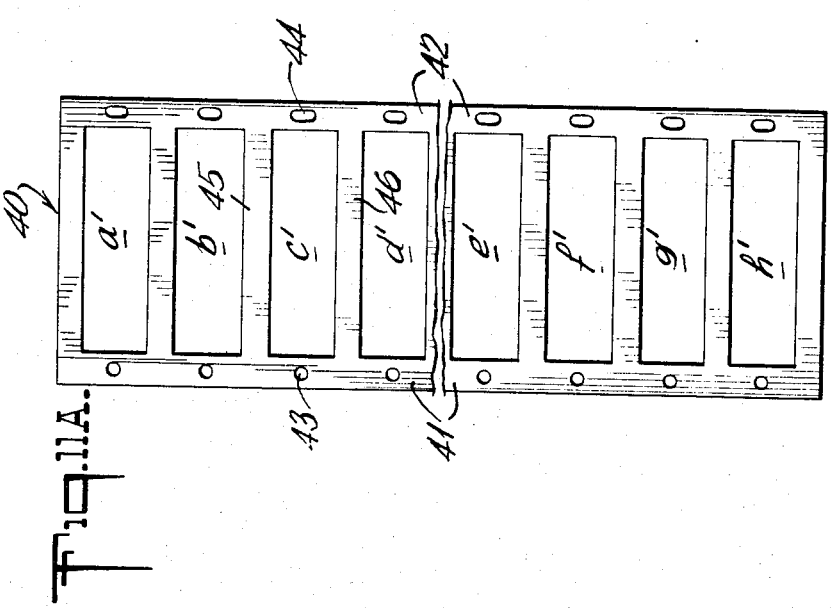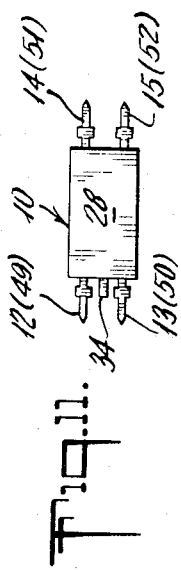

FLEXIBLE MEANS FOR MEASURING LIQUID LEVEL

This application is a continuation of application Ser. No. 417,455 filed Sept. 13, 1982, now abandoned, which is a continuation of application Ser. No. 093,181 filed Nov. 13, 1979, which was a division of application Ser. No. 912,218 filed June 5, 1978.

The invention relates to an improved elemental and assembled magnetically-sensitive unitary structure, specifically embodying a sealed magnetic-reed switch element, as for use in a depth-sensing transmitter for tank-level indicating purposes.

Present practice in the construction of depth-sensing transmitters of the character indicated in painstakingly and precisely to mount plural magnetic-reed switch elements and their associated network resistor elements to a rigid elongate base, all performed as individual operations at the factory, and all preassembled to ultimate specified length and network constants, within a protective guide tube, prior to shipment from the factory. The technique is laborious, and each job is fabricated on what amounts to essentially a custom basis.

It is an object of the invention to provide an improved construction of the character indicated.

It is also an object to provide for use in such construction a unitary network assembly or module which includes a switch element of the character indicated and which lends itself to selective use in such interconnected multiples as may be required for various specific applications.

It is another object to provide an electrically interconnected elongate assembly of switch-element networks, of such nature as to be directly utilizable in interconnected multiple after cut-off from the elongate length.

Another object is to achieve the above objects with an elemental network construction in which all structural parts are embedded in potting material, with externally projecting terminals positioned for correct electrical interconnection of plural such networks in cascaded multiple, as cooperating parts of the same transmitter.

A further object is to provide a multiple-unit assembly of the character indicated wherein the interconnected networks are capable of flexible articulation with respect to each other; specifically, such flexibility is desired as to enable coiled lay-up of the elongate assembly, for shipping purposes, and to enable cut-off to length as may be needed for a variety of on-site installation purposes.

It is another object to provide an elemental construction of the character indicated and lending itself to mass-production of network units, as well as to mass-production of an elongate flexible assembly of such units.

It is a general object to meet the above objects with the high degree of accuracy inherent in present custom constructions and which, additionally, permits far greater latitude in primary assembly phases, improves shipping characteristics, and greatly simplifies on-site installation.

Other objects and various further features of novelty and invention will be pointed out or will occur to those skilled in the art from a reading of the following specification in conjunction with the accompanying drawings.

In said ddrawings, which show, for illustrative purposes only, preferred forms and methods of the invention:

FIG. 1 is a simplified view in perspective of an encapsulated elemental switch-element network unit of the invention, in exploded relation to a flexible carrier or base strip to which it is to be assembled;

FIG. 2 is a simplified fragmentary vertical sectional view of a tank and liquid-level mechanism in which the network of FIG. 1 may be embodied;

FIG. 3 is a simplified view in perspective of the network of FIG. 1 with upper encapsulation removed, to display an illustrative internal arrangement of component elements;

FIG. 4 is a fragmentary longitudinal sectional view to show an assembled array of a plurality of the network units of FIG. 1;

FIG. 5 is a simplified electrical diagram to show cooperative electrical functioning of units interconnected as in FIG. 4;

FIG. 6 is a view in perspective to illustrate a supply reel or spool suitable for coiled shipment and pay-out of an elongate assembly of the nature shown in FIG. 4;

FIGS. 7 to 10 are similar plan views to illustrate stages of a manufacturing technique for making the individual network units of FIG. 1;

FIG. 11 is a plan view of an individual network unit produced by the technique of FIGS. 7 to 10;

FIG. 11A is a plan view of offal remaining after making plural units of FIG. 11;

FIG. 12 is a multiple-fragment plan view of a flexibly connected array of network units representing a modified construction and method, the separate fragments being identified a, b and c to illustrate successive manufacturing steps;

FIG. 13 is a view in side elevation, applicable to fragment c of FIG. 12;

FIG. 14 is a fragmentary andd partly broken-away perspective view to illustrate another modification;

Figure 15:
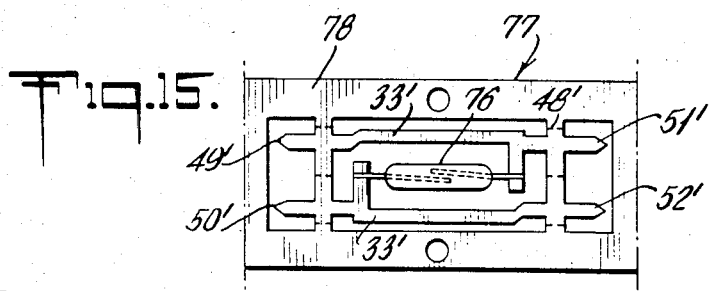
FIGS. 15 and 16 are an illustration of a pulse-counting application of the invention.

The invention will first be described in application as a tank-level-indicating (TLI) insert, comprising a plurality of encapsulated network units 10 assembled to a flexible elongate base strip or carrier 11, which may be of insulating material such as a fiber-glass-filled plastic. Each encapsulated unit 10 is elongate and generally rectangularly prismatic and is equipped with stiffly compliant flat projecting terminal-strip elements 12–13 at one end and 14–15 at the opposite end, elements 12–13–14–15 being all downwardly bent as mounting lugs or legs which extend sufficiently below the body of unit 10 to pass through and to project beyond corresponding anchoring apertures 12'–13'–14'–15' in the carrier 11. Notched shoulder formations, as at 16, limit terminal-lug insertion into the indicated apertures, at a point establishing a unit-body clearance d (FIG. 4) of body 10 above carrier 11, and the lugs 14–15 of the next-adjacent unit to the left of unit 10 in FIG. 1 will be understood to use the same apertures 12'–13' as are shown in FIG. 1 to accept insertion of lugs 12–13 of unit 10 of FIG. 1.

To complete multiple-unit assembly to the carrier 11, the terminal lugs 12–14 and 13–15 of adjacent ends of adjacent units are first twisted together below the lower surface of the carrier and are then soldered for permanent electrical connection, the profile of the soldering bead being illustratively shown by phantom outlines 17 in FIG. 4; preferably, the described fit of two lugs (e.g., 13–15) into a single aperture (e.g., 13') is snug, to enable positive development of the described twist and to enable each solder bead 17 to provide a positive stop against later removal from assembled relation to carrier 11. Preferably also, the described multiple-unit assembly to carrier 11 is thereafter assembled as by insertion into a pliant encasing envelope 18 of tubing, such as vinyl or polyethylene tubing, for protection of the soldered connections and for greater ease of handling and manipulation.

In the illustrative tank-level application of FIG. 2, the described elongate TLI transmitter insert of FIG. 4 will be understood to be inserted into and vertically oriented within a non-magnetic rigid supporting tube 20, supported from a suitable fitting 21 through the removable cover plate 22 for service access via a flanged port 23 in a liquid vessel or tank 24. An annular float 25 is shown guided by tube 20 and will be understood to carry permanent-magnet means (not specifically shown) of such strength as to operate the one or more magnetically sensitive elements of adjacent units 10 in instantaneous magnetic-field proximity thereto. The tube 20 may be straight and vertical, but I suggest at the lower portion 20' thereof that it may also be curved, as to adapt to the contour of a side tank in a ship, the TLI insert of FIG. 4 being understood to flexibly adapt to such contour in the course of insertion into tube 20. A junction box 26 and a remote conduit connection thereto are shown for accommodation of electrical connections between the TLI transducer and associated remote electrical instrumentation.

In the form shown, the encapsulation of the electrical network associated with each unit 10 comprises upper and lower nested casing halves 28–29 which will be understood to contain circuit elements of the network, as well as anchored portions of all terminal-strip elements 12-13-14-15, the anchoring being established by a solid plastic potting embedment of said elements within and to the inner wall surfaces of the casing halves. However, for sake of clarity in FIG. 3, the potting has been omitted to reveal the network elements as a glass-encased magnetic-reed switch 30, a first or voltage-dividing resistor 31 and a second or averaging resistor 32. Also revealed in FIG. 3 is a solid bus connection strip 33 from the longitudinal ends of which both of the terminal lugs 12-14 integrally extend; in contast, the anchored ends of terminal lugs 13-15 project toward each other but are connected only by the leads of resistor 31. The switch element 30 forms part of means connecting one end of resistor 31 to the bus connection 33, and in the form shown this is a series connection with the averaging resistor 32, the series connection being established via a lug strip 34 which is partly anchored (by potting embedment within casing 28–29) and which is partly externally exposed at one longitudinal end of the unit, for unambiguous interpretation of the parts relationship within the potted casing.

The described arrangement of network parts within the potted unit is depicted in electrical-circuit symbolism in FIG. 5, which also depicts the relationship of coacting plural networks, resulting from the described assembly of units 10 (FIG. 4). Thus interconnected, the bus elements 33 are seen to define a single conductive line which can be terminated at its upper end at a first terminal-lead connection A to the terminal lug 12 of the uppermost end of the uppermost unit 10; the designation A will be understood to suggest preferably an insulated flexible conductor which may be threaded through a first lead aperture A' at the upper end of carrier 11, for flexible-lead accessibility at junction box 26. Thus interconnected, each resistor 31 is seen as one of a plurality of series-connected elements of a voltage divider, available for tapping to line 33, depending upon the level at which switch 30 (or switches 30) of an adjacent one or more units 10 is currently operated (closed) by the float magnet; the upper end of this voltage divider is accessible via a second terminal lead connection B to the terminal lug 13 of the uppermost end of the uppermost unit 10, and the designation B will be understood to suggest preferably a second insulated flexible conductor which may be threaded through a second lead aperture B' at the upper end of carrier 11.

To complete electrical connections of the TLI transmitter, a third insulated flexible conductor 35 will be understood to be connected to the lowermost terminal lug 15 of the lowermost unit 10 and to extend to an upper terminal lead C, via a third threading aperture C' at the upper end of carrier 11. The legend in FIG. 5 suggests that excitation voltage is applied across the voltage divider at leads B–C, and of course depth-indicating readings may be measured across lead A and one or the other of leads B–C, depending upon the desired direction of reading depth of liquid (or liquid clearance from the top of the tank).

FIG. 6 illustrates that an elongate array of switch-network units 10 on a carrier 11, and protectively shrouded by flexible tubing 18, lends itself to coiled storage, shipment or other handling, for example on and between side flanges of a spool 37 of the type customarily used for handling electrical cable. Preferably, the tubing 18 is transparent so that all units 10 therein are visible, thus aiding clean cut-off of a desired smaller plurality as needed for a given on-site TLI-insert installation or TLI-insert replacement.

FIGS. 7 to 11 illustrate successive steps in a method of manufacturing individual network units 10 on a mass-production basis, which may be fully automated, if desired. The method commences with formation of a suitable multiple-element lead-frame blank 40 (FIG. 7) which is shown with eight repeats (a-b-c-d-e-f-g-h) of the identical cut-out or lattice-like pattern of integrally interconnected conductive strips. The blank 40 may be formed by known photographic etching and/or deposition techniques; however, I prefer that it be punched out from a single discrete rectangular sheet of conductive metal (e.g., brass or copper) of the overall dimensions M-N shown, or that it be progressively stamped from a continuously paid-out length of strip material of width N, as will be understood.

The patterns a . . . h are all defined between and integrally formed with elongate side-frame members 41–42 which, in the longitudinal sense of each of the individual patterns a . . . h, may be considered as longitudinal-end-frame members. Frame member 41 has locating circular apertures 43 in register with each of the patterns a . . . h, and frame member 42 has similar but oblong apertures 44, for accurate and unambiguous tool-positioning register with these particular frame members. Patterns a . . . h are also defined between and integrally formed with connecting frame members which integrally connect members 41–42 and which are identified 45-46, for the case of the two adjacent connecting frame members which define the opening for pattern c, taken as illustrative. Thus, the illustrative pattern c will be understood to be integral with and contained within its own frame, comprising longitudinally extending elongate side-frame members 45-46 and end-frame members 41-42.

Each lattice-like pattern of the blank 40 comprises interconnected strips which are connected (a) by a first severable-strip portion 47 connecting the elongate side-frame members 45-46 near but spaced from the end 41 of the frame and (b) by a second severable-strip portion 48 connecting the elongate side-frame members 45-46 near but spaced from the other end 42 of the frame. Two laterally spaced terminal-strip portions 49-50 are integral with and in longitudinal cantilevered projection from the severable strip 47, in the direction of and short of the adjacent end frame 41; similarly, two laterally spaced terminal-strip portions 51-52 project from the severable strip 48, in the opposite direction and short of the adjacent end frame 42. A bus-strip portion 53 is near but laterally spaced from the adjacent elongate side frame 45 and integrally connects the severable-strip portions 47-48 at generally the alignment of the terminal-strip portions 49-51 which are near said elongate side frame 45. A first mounting-strip portion 54 is integral with and in cantilevered projection from the first severable-strip portion 57 and extends in the direction of the remote frame end 42 and at generally the alignment of the associated terminal-strip portion 50, which is near the other elongate side 46 of the frame; and similarly, a second mounting-strip portion 55 is integral with and in cantilevered projection (in the opposite direction) from the second severable-strip portion 48, the mounting-strip portion 55 being shown with a laterally offset dog-leg end, to facilitate circuit-element assembly, as will become clear. Finally, a third severable-strip portion 56 is integral with and in cantilevered projection from the first severable-strip portion 47 at an intermediate location, between terminal-strip alignments 49-51 and 50-52, the mounting-strip portion 56 being shown with a log-leg end and extending in the direction of the remote end 42.

Having formed the blank 40, all is in readiness to accept assembly of electrical components 30-31-32 thereto (FIG. 8). Preferably, the leads to each of these components are trimmed to length as appropriate for overlapping registry with and soldered connection to the mounting-strip portions 54-55-56, when all components 30-31-32 are in side-by-side longitudinally extending adjacency, as shown. Thus, the leads of the divider resistor 31 are electrically connected to mounting-strip portions 54-55, the leads of switch 30 are electrically connected to mounting-strip portions 55-56, and the leads of resistor 32 are electrically connected to mounting-strip portion 56 and to a short offset 57, forming part of the bus-strip connection 53. It will be understood that the described components may be positioned in register with their correct mounting-strip portions, and soldered as described, by manual means or by automated means.

Having assembled electrical components to the blank 40, the encapsulation may be performed by transfer molding, unit by successive unit, or in batches appropriate to the number of units per lead-frame blank 40, here shown as eight. However, in the form illustrated, each capsule employs two injection-molded casing halves 28-29 which are installed on the lead-frame blank 40, prior to filling the capsules with potting material such as an epoxy. Thus, the separate casing halves 28-29 are fitted to each other via opposite sides of each unit assembly of components (FIG. 9), it being understood that local edge cut-outs in one or both casing halves permit correct casing location and a relatively tight interfit between casing halves. With the casing halves thus held to each other and to blank 40 by suitable means (not shown), epoxy potting material is injected via sprue means (suggested by an arrow 58, FIG. 1) extending vertically upward through a central carrier opening and through a registering opening (not shown) in the lower casing half 29. In spite of the tight and accurate fit of casing halves to each other and to blank 40, small air-bleed crevices remain to permit air-displacement during the operation of filing with potting material, resulting in some exuded flashing external to the interfit.

After curing, FIG. 10 indicates by legend my preference to place the blank 40 with its load of cured encapsulations into a suitable press for removal of flashing around all capsules. Thereafter, the loaded blank is placed in a blanking press to perform all shearing operations needed to sever each encapsulated unit (FIG. 11) from its surrounding frame, leaving an offal comprising essentially the framework 41-42-45-46 (FIG. 11A). In this final shearing step, all operations occur only on the severable strips 47-48, care being taken that the removed scraps are sufficiently short, to define insertion-limiting shoulders at the base end of all terminal-strip members, as described at 16 in the case of terminal 12 (defined by terminal-strip portion 49).

The various fragmentary views of FIGS. 12 and 13 illustrate a modified construction and method of the invention wherein the encapsulated units are severably assembled to a continuously elongate lead-frame blank 60. (FIG. 12a), which is the basis of permanent but flexibly articulated mechanical and electrical end-to-end connection of all units. Significant lead-frame elements described in connection with FIG. 7 will be recognized as having their counterparts in successive repeats of the lattice-like patterns of blank 60, and therefore these elements in FIG. 12a are given the same reference numbers, with primed notation, for the case of two adjacent unit patterns m, n. Aside from the end-to-end configuration of adjacent patterns, the FIG. 12a arrangement differs from the blank 40 of FIG. 7 in that there are no end-frame members and no terminal-strip portions; instead, a single severable-strip portion 61 integrally connects spaced elongate continuous side-frame members 62-63 and integrally also serves both (a) the right-end bus and mounting formations (53'-57'-55') of one unit pattern (m) and (b) the left-end bus and mounting formations (53'-56'-54') of the next-adjacent unit pattern (n). Circuit components 30-31-32 for each successive network are assembled and secured to each unit pattern in the manner already described, resulting in the assembled appearance of FIG. 12b; and potted encapsulation proceeds as already described, resulting in the appearance of FIG. 12c, after curing, and after trimming the flashing.

In the embodiment and method of FIG. 12, the final blanking step is operative only on the severable strip 61, namely to cut off connections to side-frame members 62-63, and to cut off strip 61 connections on both lateral sides of mounting-strip portion 56'. Such portions of each severable strip 61 as remain after final blanking will be understood to provide total electrical and mechanically flexible interconnection of all encapsulated units 10', as shown in FIG. 12c and FIG. 13. Although not shown, it is preferred to complete the continuously elongate array by shrouding the same in plastic tubing, as at 18 for the form of FIG. 4. The completed article can then be coiled, shipped, and handled as described for FIG. 6, with on-site cut-off (at 61) to length as desired.

FIG. 14 illustrates application of the invention to a flexible insulated multi-conductor cable 65 wherein the several conductors 66-67-68 are held by an insulating body 69 in laterally spaced relation, providing a flat overall section. In this modification, the outer conductors 66-68 are allowed to remain continuous, and the center conductor 67 is severed at each desired location of a switch-network unit of the invention. In severing the conductor 67, body material is also locally removed, to an extent producing a cavity 70 to permit insertion of the switch-network components into cavity 70 (between conductors 66-68) and their connection (a) to the adjacent severed ends of conductor 67 and (b) to an adjacent part of the outer conductor 66. The components 30-31-32 may be preassembled (i.e., electrically and mechanically connected) to each other prior to their assembly to cable 65, and their connections to conductors 66-67 are shown by way of crimp connectors 71-72 (for the respective ends of the dividing resistor 31) to severed ends of conductor 67, and 73 (for the connection of averaging resistor 32) to conductor 66. Upon such assembly, the cavity 70 may be filled and the thus-spliced cable and switch-network may be encapsulated in potting material as by transfer molding and as suggested with some exaggeration by phantom outline of a capsule-body profile 74. The resulting structure is a flexibly compliant ribbon of cable wherein the outer conductors 66-68 maintain longitudinal integrity and sustain all tension forces. In terms of multiple-unit connections, and with reference to FIG. 5, the conductors 66-67-68 will be seen to provide the functions of lines A, B, and C, respectively. Thus, no additional line is needed, the return line (35) connection being established once the cable, with its multiple switch-network units spliced thereto, has been cutoff to desired length, and once the distant end of conductor 68 (line 35) has been connected to the adjacent end of conductor 67, as by crimped or soldered connector means.

The described embodiments and method of the invention will be seen to have met all stated objects, providing all the accuracy and reliability of custom-made TLI inserts and, at the same time, vastly simplifying their assembly, shipping characteristics and on-site installation. The described encapsulation eliminates the need for expensive printed-circuit boards, and in the case of FIGS. 1 to 4, the only required connections are two per unit, as described for the twisted and soldered connection 13-15 in FIG. 4, with addition of one external return wire (35) to complete necessary circuitry. Moreover, the embodiment of FIGS. 13 and 14 is a demonstration that no assembly connections are needed beyond the attachment of an external return wire (35) to complete the circuit to the end of the voltage divider at the point of cut-off.

The invention will be seen to permit use of miniature, mass-produced, magnetic-reed switches which are currently available, at considerable cost savings over presently used larger switches. These smaller switches are less than an inch long, from tip to tip of their leads, and their smaller length permits capsule design of such length that in the end-to-end array of FIG. 4, a switch-actuating (i.e., depth indicating) resolution of one inch is inherent for the case of a float magnet only actuating the closure of one to two switches in alternation, but if the magnet is operative to close two or three switches in alternation, the inherent resolution becomes one-half inch, through selection of suitable resistor values at 31-32. Typically, for a TLI insert of FIG. 4 in use to measure straight vertical depth over a range of 10 feet, this means an array of 120 switch-network units, and if the float magnet is designed to alternate between operation of two and three adjacent switch units at one time, the unit-divider resistance 31 is 10 ohms, the averaging resistor 32 is 330 ohms, and thus the total voltage-dividable resistance excited at connections B-C is 1200 ohms.

While the invention has been described in detail for the preferred forms shown, it will be understood that modifications may be made without departing from the invention. Thus, for example, the return line 35 may be incorporated into the design of the lead-frame blank (40, 60) analogous to the manner described for FIG. 13, thereby avoiding need for or use of a separate insulated wire 35. Also, the invention will be understood to be of greater application than merely as a TLI insert; for example, successive closure of switches at successive units of the array is a method of pulse generation, should pulse-count up and pulse-count down be the technique employed to identify linear position of the actuating magnet (which need not necessarily be float-borne), e.g., as a means of measuring distance of displacement of two relatively movable members.

Figure 16:
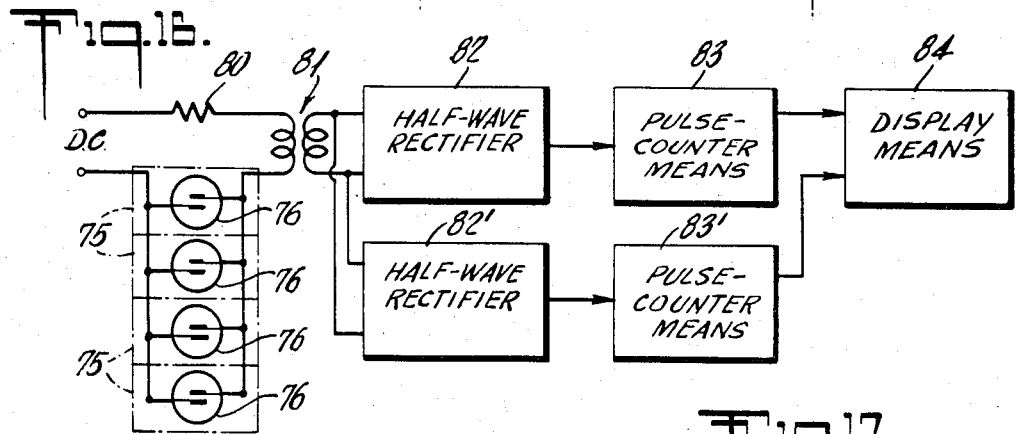

FIGS. 15 and 16 are more specifically illustrative of a pulse-counting application of the invention, wherein each encapsulated switch unit 75 contains but a single electrical component, namely, a magnetic-reed switch 76 of the character already described. Also, each unit may be made according to either of the methods already described, namely upon a continuously elongate lead-frame blank from which continuous connections remain after encapsulation and blanking (as in FIGS. 12 and 13), or, as shown, upon a continuously elongate lead-frame blank 77 from which discrete encapsulated units 75 remain after blanking to sever from the frame members 78-79 of the blank 77, resulting in the appearance and carrier-mountability discussed in connection with FIG. 1. Specifically, the lattice-like lead-frame pattern for each unit 75 is shown to comprise two like bus connectors 33' integrally and continuously connecting the separate terminal-strip portions 49'-51' and 50'-52' after blanking to sever the severable-strip portions 47'-48', the severance being at locations indicated generally by heavy dashed lines. The single switch element 76 of each unit is shown with its leads connected to lug formations of the bus connectors 33', at the respective ends of the capsule. Encapsulation, potting and blanking are as previously described.

When interconnected by mounting upon a carrier 11, all switches 76 are electrically in parallel and are precisely spaced from each other. Typically, for pulse-counting as a function of magnet traverse along the length of the array, a direct-current supply connection is made to the two end terminals of the array, via series-connected resistor and transformer-primary elements 80-81. Each switch closure is thus operative to produce a polarized pulse in the transformer secondary, a pulse of opposite polarity being generated upon each switch opening. Assuming only the first-polarity pulses to be of interest for count-up purposes, and only the second-polarity pulses to be of interest for count-down purposes, the remainder of the circuit of FIG. 16 includes like but oppositely polarized half-wave rectifiers 82-83' to select only the desired polarity pulses, pulse-counter means 83-83' for counting the pulses according to the direction of change (i.e., travel), and display or the like utilization means 84 responding differentially to the outputs of counters 83-83'.

Figure 17:
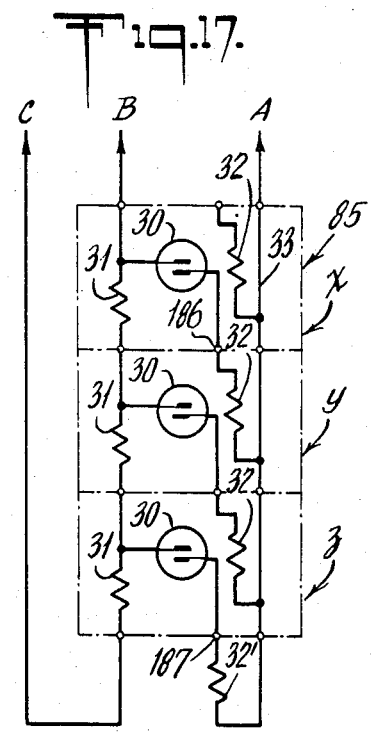
FIG. 17 is a circuit diagram of a series array of encapsulated units.

Still further employment of the invention is illustrated in FIG. 17 wherein each encapsulated unit 85 in an array utilizes series-connected components which share adjacent encapsulations. Thus, for the case of adjacent encapsulated units at locations x, y and z, the switch component 30 at location x is in series with the averaging-resistor component 32 at location y, the voltage-dividing resistor 31 being connected as already described. The arrangement will be seen to facilitate preassembly of the series-connected elements 30-32, at precise spacings, and relying upon mechanical flexibility of their interconnection at 186, the remaining lead of switch 30 being connected to the upper lead end of resistor 31, and the remaining lead of resistor 32 being connected to the bus 33.

Terminal connections to the FIG. 17 embodiment are made at A, B and C as discussed in connection with FIG. 5, except that at the remote end of location z the exposed lower-switch lead connection 187 must be connected to the bus 33 via an additional averaging resistor 32', as shown.

Figure 18:
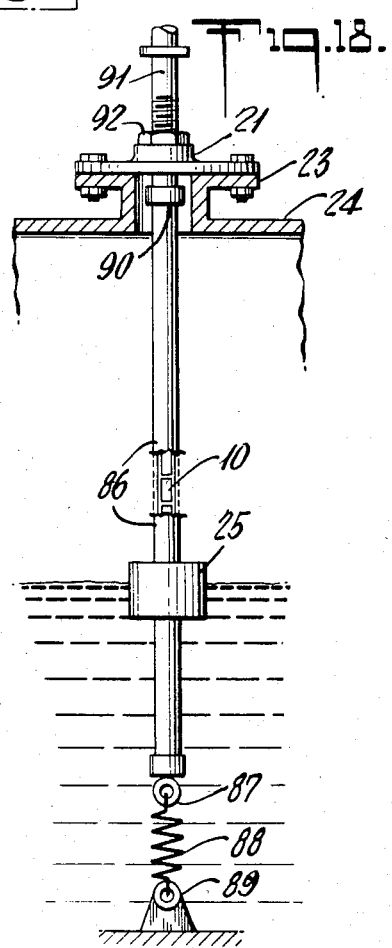
FIG. 18 is another liquid volume application of the invention.

Still further, FIG. 18 illustrates that the invention is not limited to insertion of a flexible TLI-insert strip into a rigid tube, even for liquid-level measurement purposes. The TLI-insert strip in FIG. 18 will be understood to be contained within a reinforced flexible hose 86 which is terminated at its lower end by a suitable fitting 87 having spring-connection 88 to a hook or eye 89 fixed to the bottom of the tank 24. The upper end of hose 86 is shown clamped at 90 to jack means 91-92, by means of which spring tension at 88 may be initially set as necessary. In use, it will be seen that flexibility of the switch array contained in hose 86 will permit the insert and its support to yield, as a liquid volume may be caused to displace laterally in the course of a tanker vessel motion when at sea. In spite of such flexure, the ability to respond to displacement of the float magnet remains unaffected.

What is claimed is:

1. A tank-level measuring system, comprising an assembly of an elongate flexibly bendable tubular housing closed at its lower end, a magnet carrying float element encircling and guided by said housing for travel therealong as a function of the level of the fluid being measured, a flexibly bendable interconnected array of a plurality of magnetically-sensitive electrical switch units in uniformly spaced and electrically interconnected successive longitudinal array within and along the length of said tubular housing, said array being free for withdrawal lengthwise from said housing and reinsertable at will, and electrical-connection means connected to the upperunit end of said array; said assembly of housing and interconnected array being non-destructively bendable by virtue of its mechanical flexibility without interfering with movement of said float.

2. A tank-level measuring system according to claim 1, in which said flexibly bendable tubular housing is a reinforced hydraulic-type hose.

3. A tank-level measuring system according to claim 1, in which the closed end of said tubular housing includes tank-bottom anchoring means.

4. In a tank-level measuring system wherein an elongate vertical tubular housing is closed at its lower end and contains a removable longitudinally distributed array of plural uniformly spaced electrically connected magnetically sensitive electrical switch units with electrical-connection means at the upper end of said housing, and a permanently magnetized float element encircling and guided by said housing for travel therealong accompanied by interaction with different switch elements as a function of its buoyant position, the improvement wherein said tubular housing is non-destructively bendable and in which said switch units are interconnected by mechanically flexible means free of rigidification for enabling the array to bend with bending of said housing while retaining its removability and reinsertability as a unit lengthwise from and into said housing.

5. The improvement of claim 4, wherein said tubular housing is fixedly mounted to upper tank structure at its upper end and is resiliently connected at its lower end to the bottom of the tank structure.

6. In an apparatus for ascertaining the upper level of a supply of flowable material which is confined in a vessel and wherein a switch-actuating element rides up and down along a vertically mounted housing in the vessel and floats on said supply of flowable material at the surface of said material to rise and fall with the level thereof, the combination, disposed as a removable and reinsertable unit within said housing, of an elongated tubular sheath consisting of flexible insulating material; an elongated carrier consisting of a longitudinally substantially inelastic strip of flexible insulating material confined in said sheath; and a plurality of electrical components mounted in longitudinally spaced array on said carrier with electrical-connection means at the upper end of said housing, said components including a row of uniformly spaced-apart electric switches which extend in the longitudinal direction of said carrier and each of which is actuatable by said element when the latter is in proximity to a respective switch, said carrier having said components so mounted thereon as to be readily flexible without damage to said components so as to allow said carrier and said sheath, when outside of said housing, to be converted by flexing into a compact configuration occupying a volume whose maximum dimension is a small fraction of the length of said sheath.

7. The combination of claim 6, wherein said carrier and sheath are sufficiently flexible to permit forming convolutions each having a diameter approximating that of the drum of an electrical cable spool.

8. The combination of claim 6, wherein said components further comprise a row of spaced-apart electrical resistors each of which is adjacent to one of said switches.

9. The combination of claim 8, wherein said resistors are connected in series, and said components further comprise flexible conductor means soldered to said resistors and to said switches.

10. In a tank-level measuring system wherein an elongate vertical tubular housing is closed at its lower end and contains a removable longitudinally distributed array of plural uniformly spaced electrically connected magnetically sensitive electrical switch units with electrical-connection means at the upper end of said housing, and a permanently magnetized float element guided by said housing for interaction with different switch elements as a function of its buoyant position, the improvement wherein said tubular housing is curved over at least a portion of its length and is effectively rigid, and in which said switch units are interconnected by mechanically flexible means for enabling the array to bend and follow the curve of said housing during full insertion or removal of said array of switch units via the upper end of a tank-installed housing.

* * * * *